United States Patent
Jheng et al.

(10) Patent No.: US 10,015,835 B2
(45) Date of Patent: Jul. 3, 2018

(54) MAINTAINING A PACKET-SWITCHED SIGNALING CONNECTION DURING HANDOVER BETWEEN CELLS

(71) Applicant: MEDIATEK INC., Hsinchu (TW)

(72) Inventors: Yu-Syuan Jheng, Taipei (TW); Chien-Chun Huang-Fu, Hsinchu (TW); Hung-Lin Chang, Taipei (TW); Yuan-Chieh Lin, Taipei (TW)

(73) Assignee: MEDIATEK INC., HsinChu (TW)

( * ) Notice: Subject to any disclaimer, the term of this patent is extended or adjusted under 35 U.S.C. 154(b) by 0 days.

(21) Appl. No.: 15/712,323

(22) Filed: Sep. 22, 2017

(65) Prior Publication Data
US 2018/0014349 A1 Jan. 11, 2018

Related U.S. Application Data

(63) Continuation of application No. 14/644,434, filed on Mar. 11, 2015, now Pat. No. 9,814,090.
(Continued)

(51) Int. Cl.
*H04W 36/00* (2009.01)
*H04W 76/06* (2009.01)
*H04W 76/04* (2009.01)

(52) U.S. Cl.
CPC ..... *H04W 76/068* (2013.01); *H04W 36/0066* (2013.01); *H04W 76/046* (2013.01)

(58) Field of Classification Search
CPC ............... H04W 76/068; H04W 24/10; H04W 36/0083; H04W 36/14; H04W 76/046
See application file for complete search history.

(56) References Cited

U.S. PATENT DOCUMENTS

| 8,983,532 B2 * | 3/2015 | Arzelier | H04W 4/12 |
| | | | 370/328 |
| 2007/0270140 A1 | 11/2007 | Islam et al. | 455/423 |

(Continued)

FOREIGN PATENT DOCUMENTS

| CN | 101291529 A | 4/2007 |
| CN | 101610504 A | 6/2008 |

(Continued)

OTHER PUBLICATIONS

International Search Report and Written Opinion of International Search Authority for PCT/CN2015/074101 dated Jun. 15, 2015(11 pages).

(Continued)

*Primary Examiner* — Keith Fang
(74) *Attorney, Agent, or Firm* — Imperium Patent Works; Zheng Jin; Darien Wallace

(57) ABSTRACT

Methods and apparatus are provided to reduce service interruption for intra-RAT and inter-RAT handover procedures. The UE performs a NAS signaling procedure via a NAS signaling connection in a mobile communication network. The UE monitors a radio resource status and determines whether a radio bearer has been or is being established for a RRC connection for data transmission. The UE determines whether to release the NAS signaling connection after completing the NAS signaling procedure based on whether the radio bearer has been established. In one embodiment, the UE monitors a radio resource status and determines whether a radio bearer has been established for a RRC connection for data transmission. The UE determines whether to start a timer upon completing the NAS signaling procedure based on whether the radio bearer has been or is being established.

16 Claims, 5 Drawing Sheets

Related U.S. Application Data

(60) Provisional application No. 61/951,691, filed on Mar. 12, 2014.

(56) References Cited

U.S. PATENT DOCUMENTS

| | | | |
|---|---|---|---|
| 2013/0308527 A1 | 11/2013 | Chin et al. | 370/328 |
| 2014/0016614 A1 | 1/2014 | Velev et al. | 370/331 |
| 2014/0220981 A1* | 8/2014 | Jheng | H04W 76/045 455/437 |
| 2014/0235193 A1 | 8/2014 | Guo et al. | 455/404.1 |
| 2014/0301366 A1 | 10/2014 | Guo | 370/331 |
| 2015/0119032 A1* | 4/2015 | Koskela | H04W 76/027 455/435.1 |
| 2015/0223122 A1* | 8/2015 | Tiwari | H04W 36/0083 370/331 |

FOREIGN PATENT DOCUMENTS

| | | |
|---|---|---|
| CN | 102892164 A | 7/2011 |
| EP | 1858209 A1 | 5/2006 |
| EP | 2622904 A1 | 9/2010 |
| EP | 3100510 A1 | 1/2014 |
| WO | WO2015114071 | 1/2014 |

OTHER PUBLICATIONS

EPO, Search Report for the EP patent application 15761083.3 dated Jun. 1, 2017 (7 pages).

* cited by examiner

MAINTAINING A PACKET-SWITCHED SIGNALING CONNECTION DURING HANDOVER BETWEEN CELLS

CROSS REFERENCE TO RELATED APPLICATIONS

This application is a continuation, and claims priority under 35 U.S.C. § 120 from nonprovisional U.S. patent application Ser. No. 14/644,443, entitled "Method to Reduce Service Interruption," filed on Mar. 11, 2015, the subject matter of which is incorporated herein by reference. Application Ser. No. 14/644,443, in turn, claims priority under 35 U.S.C. § 119 from U.S. Provisional Application No. 61/951,691, entitled "Method to Reduce Service Interruption," filed on Mar. 12, 2014; the subject matter of which is incorporated herein by reference.

TECHNICAL FIELD

The disclosed embodiments relate generally to wireless network communication, and, more particularly, to reduce service interruption time.

BACKGROUND

Third generation partnership project (3GPP) and Long Term Evolution (LTE) mobile telecommunication systems provide high data rate, lower latency and improved system performances. Handover procedure is intended to reduce the interruption time and it is an important function for the overall system performance. The handover procedure can be between base stations of the same Radio Access Technologies (RAT) or between different RATs (inter-RAT). When a handover event occurred, the radio resource is at first released in the serving radio network and then established in the target radio network. Therefore, the connection to the source is broken before or during the connection to the target is made. For a user equipment (UE) which has an ongoing session, the delay caused by the handover procedure causes a temporary service interruption if the ongoing service is a latency sensitive application. Longer interruption time will result in an unexpected service termination.

To minimize the service interruption time during the handover procedure, the UE should establish the radio resource in the target radio network as quickly as possible and remain in the connected-state. In addition, once the UE has successfully acquired the radio resource in the target radio network, the UE shall avoid unnecessary connection release; otherwise, the UE needs to perform reestablishment to regain the service. The extra reestablish procedures result in not only user experience degradation but also being considered as a waste of radio resource.

This invention describes a method to minimize the service interruption by avoiding unnecessary connection release during underlying radio network switching.

SUMMARY

Methods and apparatus are provided to reduce service interruption for intra-RAT and inter-RAT handover procedures. The UE performs a NAS signaling procedure via a NAS signaling connection in a mobile communication network. The UE monitors a radio resource status and determines whether a radio bearer has been established or is being established for a RRC connection for data transmission. The UE determines whether to release the NAS signaling connection after completing the NAS signaling procedure based on whether the radio bearer has been or is being established. In one embodiment, the UE monitors a radio resource status and determines whether a radio bearer has been established or is being established for a RRC connection for data transmission. The UE determines whether to start a timer upon completing the NAS signaling procedure based on whether the radio bearer has been or is being established.

In one embodiment, the UE initiates a RAU request to a SGSN in the same RAT. Upon receiving the RAU accept message from the SGSN with The Follow-on proceed bit coded as "no follow-on proceed", the UE checks if there is a radio resource allocated in the new radio network. If the UE determines that a radio resource has been or is being allocated in the new radio network, then the UE will not start the T3340 timer.

In another embodiment, the UE initiates a RAU request to a SGSN in the same RAT. Upon receiving the RAU accept message from the SGSN with The Follow-on proceed bit coded as "no follow-on proceed", the UE starts the T3340 timer. Upon the expiration of the T3340 timer, the UE checks if there is a radio resource allocated in the new radio network. If the UE determines that a radio resource has been or is being allocated in the new radio network, then the UE will not release the PS signaling connection.

In yet another embodiment, the improved handover procedure applies to inter-RAT handover. The UE switches from the first RAT to the second RAT during the inter-RAT procedure. The UE initiates a RAU request to a SGSN in the second RAT. The UE starts radio-bearer-setup procedure with the second RAT. Upon receiving the RAU accept message from the SGSN with The Follow-on proceed bit coded as "no follow-on proceed", the UE checks if there is a radio resource allocated in the new radio network. If the UE determines that there is a radio resource allocated in the new radio network, then the UE will not start the T3340 timer. In an alternative embodiment, during the inter-RAT handover, the UE starts a T3340 timer upon receiving the RAU accept message from the SGSN with The Follow-on proceed bit coded as "no follow-on proceed". Upon the expiration of the T3340 timer, the UE checks if there is a radio resource allocated in the new radio network. If the UE determines that there is a radio resource allocated in the new radio network, then the UE will not release the PS signaling connection.

Other embodiments and advantages are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

The 3GPP LTE system has been designed to offer significantly higher data rates, higher system throughput, and lower latency for delay critical services. One of the main goals of LTE, or any wireless system, is to provide fast and seamless handover from one cell (a source cell) to another (a target cell). The impact of the LTE handover procedures on the overall user experience is important to the overall system performance. The improved handover performance has to be provided and guaranteed under various mobility conditions, including intra-RAT handover and inter-RAT handover.

Figure 1:
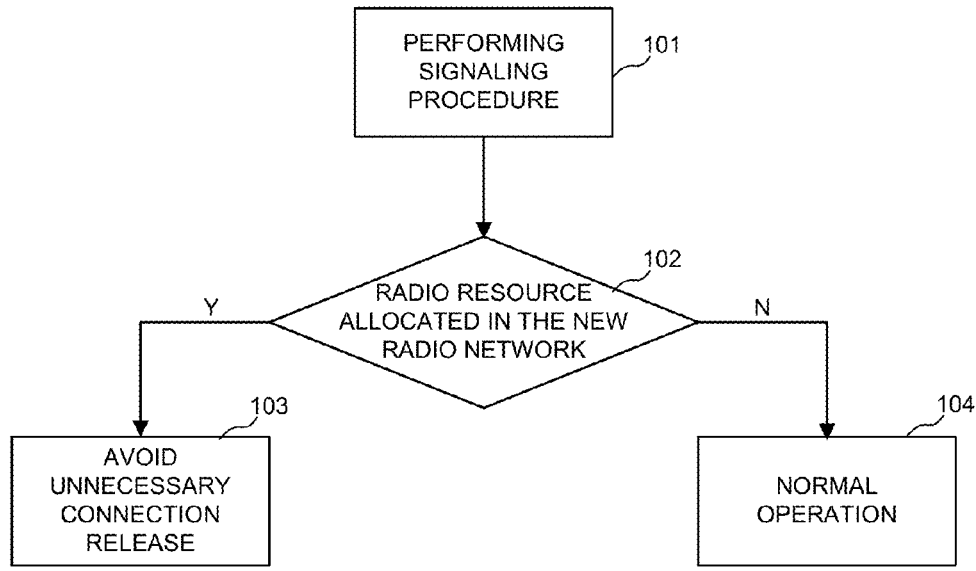
FIG. 1 is an exemplary flow chart of the improved handover procedure for an intra-RAT handover.

FIG. 1 is an exemplary flow chart of the improved handover procedure for an intra-RAT handover. At step 101, the UE performs signaling procedures. There are different types/purposes for various signaling procedures during operation. When the UE is performing signaling procedure whose purpose is not to request for radio bearer allocation one or more radio bearer may still be allocated to the UE during the signaling procedure. For example, during a registration procedure, one or more radio bearer may still be allocated. This may occur when the network detects downlink packet to be sent to the UE during the signaling procedure. In order to reduce the service interruption time and avoid radio resource waste, the UE should not release the connection in this case or stop the connection release timer. At step 102, the UE checks if the radio resource has already been allocated in the new radio network. If step 102 determines that the radio resource is already allocated, the UE moves to step 103. At step 103, the UE takes steps to avoid unnecessary connection release. If step 102 determines that the radio resource is not allocated, the UE moves to step 104 and continues with the normal operation.

Figure 2:
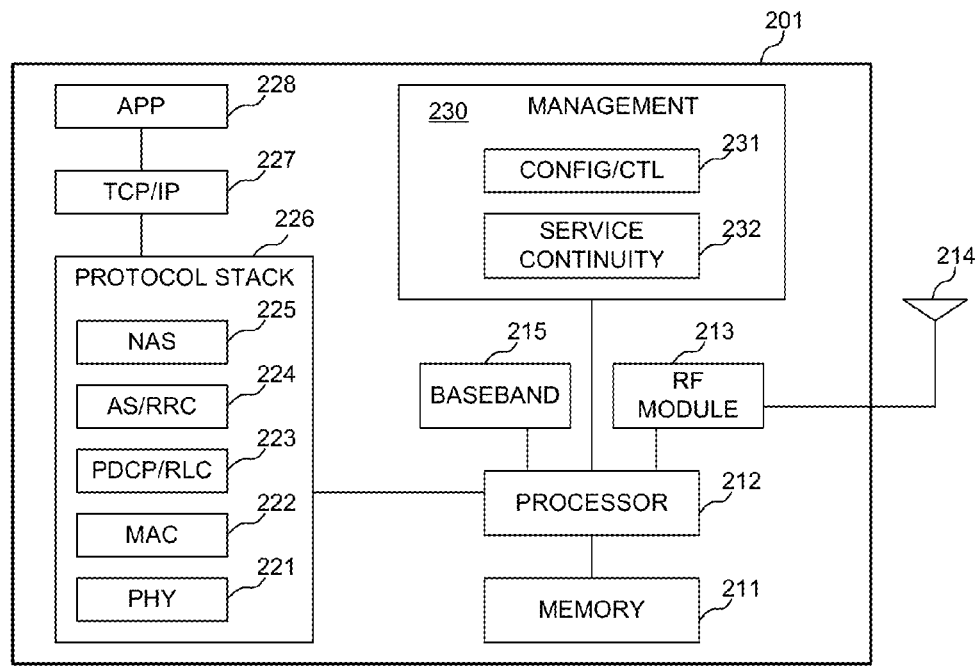
FIG. 2 is a simplified block diagram of a user equipment that supports certain embodiments of the present invention.

FIG. 2 is a simplified block diagram of a user equipment (UE) 201 that supports certain embodiments of the present invention. UE 201 comprises memory 211, a processor 212, a radio frequency (RF) module 213 coupled to antenna 214, a baseband module 415, a 3GPP protocol stack module 226 supporting various protocol layers including NAS 225, AS/RRC 224, PDCP/RLC 223, MAC 222 and PHY 221, a TCP/IP protocol stack module 227, an application module APP 228, and a management module 230 including a configuration/control module 231, and a service continuity module 232. The function modules and circuits, when executed by processor 212 (via program instructions contained in memory 211), interwork with each other to allow UE 201 to perform certain embodiments of the present invention accordingly. For example, each functional module or circuit may comprise a processor together with corresponding program codes. Configuration and control module 231 configures handover service interruption reduction features for the UE, monitors a radio resource status, and thereby determines whether a radio bearer has been established for an RRC connection for data transmission. Service continuity module 232 determines whether to release the NAS signaling connection after completing the NAS signaling procedure based on whether the radio bearer has been established or is being established.

In one novel aspect, procedures related to the GPRS Mobility Management (GMM) Timer T3340 are modified to reduce the service interruption during handover. In the current system, a timer T3340 is started upon receiving ROUTING AREA UPDATE ACCEPT message with the Follow-on proceed bit coded as "no follow-on proceed". Upon the expiration of the T3340 timer, the PS signaling connection is released without checking whether there is existing radio bearer is being or has been allocated for the data transferring. When the PS signaling connection is released during a handover process when one or more radio bearers are allocated, signaling reestablishment is required to regain the service. Such unnecessary reestablishment is time and resource consuming and may result in unnecessary service interruption.

In the wireless network, the UE performs routing area update procedure in two cases. The first is when the UE first enter a new routing area or for parameter or configuration synchronization, the routing area update procedure is performed. The second is the periodic routing area update performed by the UE. During an inter-SGSN RAU procedure, the new SGSN find the old SGSN from the old RAI. The old SGSN stops downlink signaling, transfer MM context and PDP context to the new SGSN and tunnels N-PDU to the new SGSN. The PDP context and the subscriber data is updated too. The signaling exchanges among the network entities, such as SGSN, MSC/VLR, and MSC/RLR. The PS signaling channel between the UE and the network entities remains connected during the RAU procedure. Traditionally, upon completion of the RAU process, the NAS layer would set a follow-on request pending, follow-on proceed flag. The NAS entity setting this flag does not consider the activities in the radio resource layer. During a handover process, the UE may start the radio-resource establishment process before the completion of the RAU procedure. The NAS layer, upon completing the RAU process may set the no follow-on proceed indicator in the routing area update accept message, which concludes the signaling process from the NAS entity side. The UE would start the T3340 timer upon decoding the no follow-on proceed indicator. Upon the expiration of the T3340 timer, the UE sends signaling connection release indication message to release the PS and the whole Iu connection. This release procedure is started even when there is ongoing PS call but there was no CM request pending during the initiation of RAU procedure. The PS connection-release procedure is unnecessary and results in additional signaling overhead.

In one novel aspect, a modified T3340 procedure is used. Before starting the T3340 timer, the UE check if there is or has been any radio-resource-setup procedure. If there is, then the T3340 timer is not started. This avoids the trigger PS connection-release upon the expiration of the T3340. In another novel aspect, the T3340 is started. However, upon the expiration of the T3340 timer, the UE checks if there is or has been any radio-resource-setup procedure. If there is, then the PS connection-release procedure is not started to avoid the signaling overhead and thus reduce the service interruption.

Figure 3:
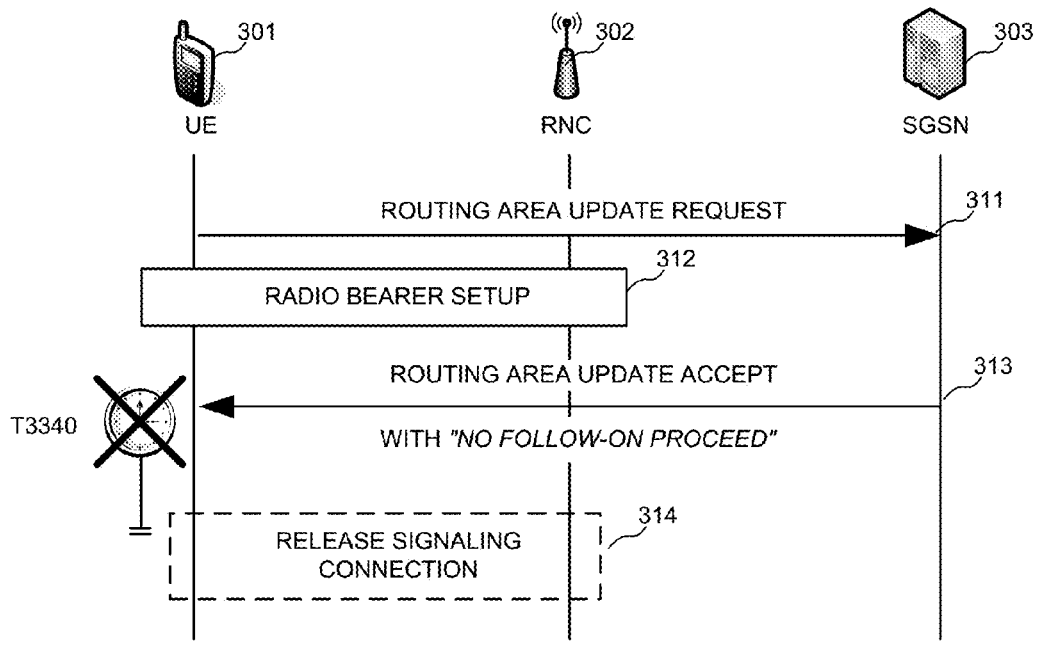
FIG. 3 shows an exemplary diagram of an improved handover procedure by not starting the T3340 timer when detecting existing radio bearer setup in accordance with one embodiment of the current invention.

FIG. 3 shows an exemplary diagram of an improved intra-RAT handover procedure by not starting the T3340 timer when detecting existing radio bearer setup in accordance with one embodiment of the current invention. A wireless network includes a UE 301, a radio network controller (RNC) 302 and a serving GPRS support node (SGSN) 303. At step 311, UE 301 sends a Routing Area Update Request to SGSN 303. At step 312, UE 301 starts a radio-bearer-setup procedure with RNC 302. SGSN 303 has no knowledge of the radio-bearer-setup procedure. At step 313, SGSN 303 sends a Routing Area Update Accept message to UE 301, with The Follow-on proceed bit coded as "no follow-on proceed". In one embodiment, upon receiving the Routing Area Update Accept message with "no follow-on proceed" indicator, UE 301 checks if there exists radio-bearer-setup procedure. If UE 301 detects that there is or has been a radio-bearer-setup procedure, UE 301 does not start the T3340 timer such that the PS signaling connection remains during and after the radio-bearer-setup procedure. By not starting the T3340 timer, it prevents step 314 of releasing the NAS signaling connection.

In one example, during the radio bearer setup procedure 312, UE 301 first receives an RRC radio bearer setup message from RNC 302. After the radio bearer has been established, UE 301 then transmits an RRC radio bearer setup complete message to RNC 302. In a first scenario, upon UE 301 receives the RRC radio bearer setup message from RNC 302, UE 301 enters step 313 and determines that radio bearer is being established (radio bearer setup procedure ongoing), and UE 301 does not start the T3340 timer after performing step 313. In a second scenario, after UE 301 transmits the RRC radio bearer setup complete message to RNC 302, UE 301 enters step 313 determines that the radio bearer has been established (radio barer setup procedure completed), and UE 301 does not start the T3340 timer after performing step 313.

Figure 4:
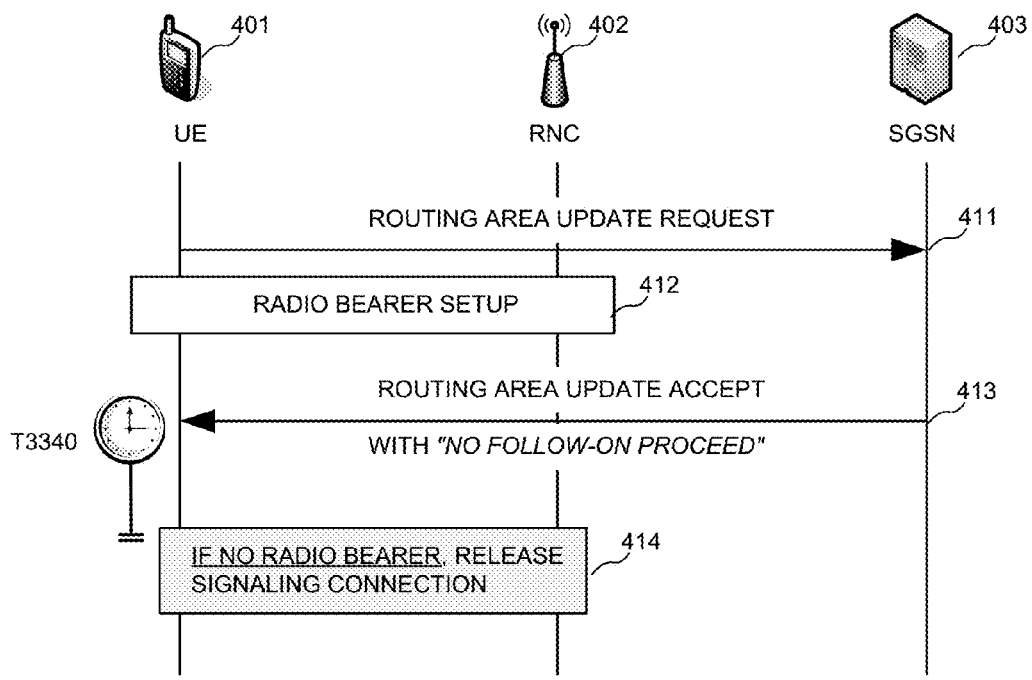
FIG. 4 shows an exemplary diagram of an improved intra-RAT handover procedure not releasing the signaling connection upon expiration of T3340 when detecting existing radio bearer setup in accordance with one embodiment of the current invention.

FIG. 4 shows an exemplary diagram of an improved intra-RAT handover procedure not releasing the signaling connection upon expiration of T3340 when detecting existing radio bearer setup in accordance with one embodiment of the current invention. A wireless network includes a UE 401, a radio network controller (RNC) 402 and a serving GPRS support node (SGSN) 403. At step 411, UE 401 sends a Routing Area Update Request to SGSN 403. At step 412, UE 401 starts a radio-bearer-setup procedure with RNC 402. SGSN 403 has no knowledge of the radio-bearer-setup procedure. At step 413, SGSN 403 sends a Routing Area Update Accept message to UE 401, with The Follow-on proceed bit coded as "no follow-on proceed". Upon receiving the Routing Area Update Accept message with "no follow-on proceed" indicator, UE 401 starts T3340. In one embodiment, up expiration of T3340, at step 414, UE 401 checks if there exists an ongoing radio-bearer-setup procedure or if a radio bearer has been established. If UE 401 detects that, there is a radio-bearer-setup procedure ongoing or a radio bearer has been established already, then UE 401 does not release the signaling connection such that the PS signaling connection remains during the radio-bearer-setup procedure. If UE 401 at step 414 determines that there is no radio-bearer-setup procedure, UE 401 releases the signal connection.

The improved handover procedure applies to inter-RAT handover procedures as well. If the handover occurred between two different technology networks, for example, UMTS and LTE, it is called Inter-RAT handover. The Inter-RAT handover can be divided into two phases, a Preparation phase, and an Execution phase. In the preparation phase, the source network decides to initiate inter-RAT handover based on the measurement report procedure. The source network will retrieve the target network and request it to reserve the resources for data forwarding. Once the preparation is done, the source network then starts the execution phase by sending a handover command to trigger the UE for the handover procedure toward the target network. If the radio resource has been allocated successfully in the preparation phase, the handover command will indicate the radio resource configuration in the target network. Therefore, the UE can directly establish the radio bearer.

In some cases, the radio resource in the target network may not be indicated in the handover command, but is directly allocated by the target network after the UE successfully connects to the target network. The network will directly setup the radio bearer by sending a specific message in the target network. After the UE successfully transferred to the new network, if the UE recognizes that it has not registered with the network, the UE shall initiate the registration procedure to inform the target network of the UE's new location. For example, when the UE handovers from LTE to UMTS and recognizes that its current Routing Area is not registered with the network, or when the UE's TIN indicates "GUTI", the UE shall initiate a Routing Area Update procedure with the target SGSN informing it that the UE is located in a new routing area. During the registration procedure (e.g., attach procedure or location update procedure), if the UE has pending uplink traffic (e.g., signaling or user data), it shall set "follow-on request" to indicate that the UE wants to reuse the connection after the registration procedure is completed. For example, during attach procedure or location update procedure, if the UE has pending uplink signaling traffic or user data, the UE shall set "follow-on request" indicator. If the UE does not set the "follow-on" indicator and the network indicates "no follow-on proceed", the UE shall start a timer, such as timer T3340 in UMTS, and release the PS signaling connection upon the expiration of T3340.

However, if any of the radio bearers has been allocated to the UE in the middle of the handover procedure, this means the network has pending downlink data prepared to send to the UE. In this case, the UE shall not start T3340 or release the connection otherwise the network shall paging UE and establish the radio bearer again for sending downlink data.

Figure 5:
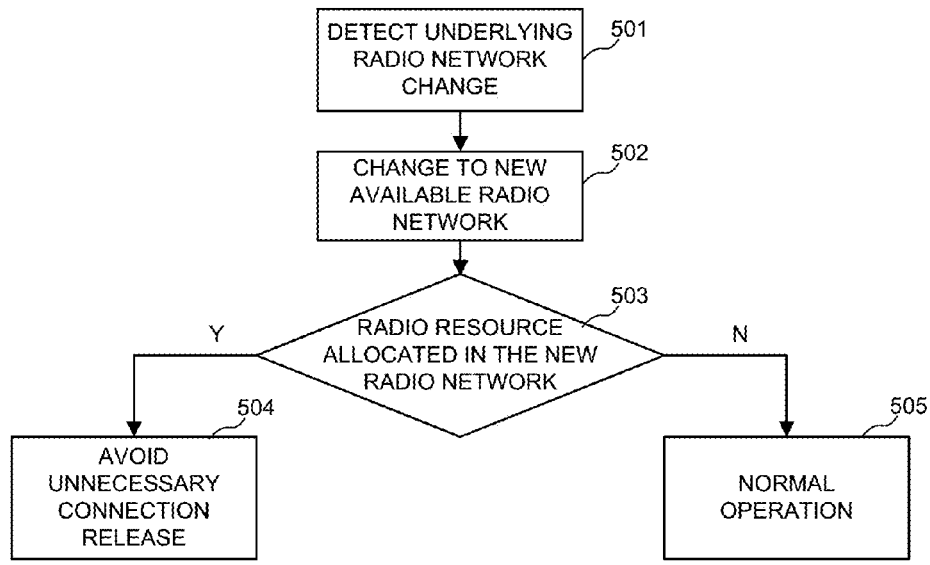
FIG. 5 is an exemplary flow chart of the improved handover procedure for an inter-RAT handover.

FIG. 5 is an exemplary flow chart of the improved handover procedure for an inter-RAT handover. At step 501, the UE detects the underlying radio network changed. When the UE is performing signaling procedure whose purpose is not to request for radio bearer allocation one or more radio bearer may still be allocated to the UE within the signaling procedure. In order to reduce the service interruption time and avoid radio resource waste, the UE should not release the connection in this case or stop the connection release timer. At step 502, the UE changes to the new radio network. At step 503, the UE checks if the radio resource has already been allocated in the new radio network. If step 503 determines that the radio resource is already allocated, the UE moves to step 504. At step 504, the UE takes steps to avoid unnecessary connection release. If step 504 determines that the radio resource is not allocated, the UE moves to step 505 and continues with the normal operation.

Figure 6:
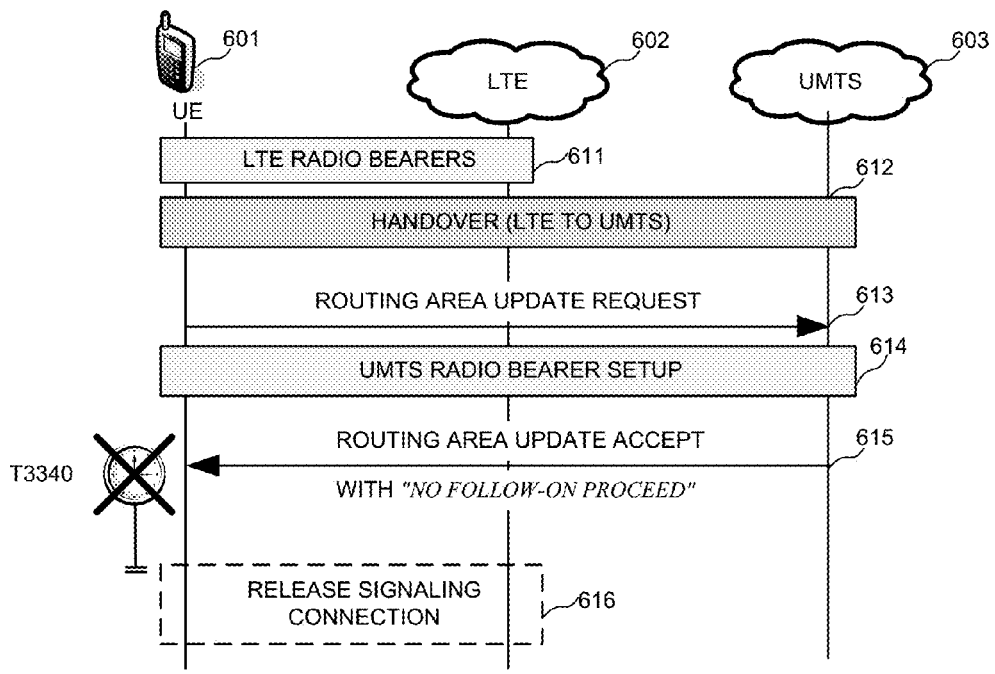
FIG. 6 shows an exemplary diagram of an improved inter-RAT handover procedure with modified T3340 procedure when detecting existing radio bearer setup in accordance with one embodiment of the current invention.

FIG. 6 shows an exemplary diagram of an improved inter-RAT handover procedure with modified T3340 procedure when detecting existing radio bearer setup in accordance with one embodiment of the current invention. A UE 601 originally connected with a LTE network 602 hands over to another RAT, UMTS network 603. At step 611, UE 601 is connected with LTE network 602 with LTE radio bearers. At step 612, UE 601 hands over from LTE network 602 to UMTS network 603 through inter-RAT handover procedure. At step 613, UE 601 sends a Routing Area Update Request to UMTS network 603. At step 614, UE 601 starts a radio-bearer-setup procedure with UMTS network 603. At step 615, UMTS network 603 sends a Routing Area Update Accept message to UE 601, with The Follow-on proceed bit coded as "no follow-on proceed".

In one embodiment, upon receiving the Routing Area Update Accept message with "no follow-on proceed" indicator, UE 601 checks if there exists radio-bearer-setup procedure. If UE 601 detects that there is or has been a radio-bearer-setup procedure, then UE 601 do not start the T3340 timer such that the PS signaling connection remains during and after the radio-bearer-setup procedure. By not starting the T3340 timer, it prevents step 314 of releasing the NAS signaling connection.

In one example, during the handover procedure 612, UE 601 receives a handover command from LTE 602. The handover command requests the UE to transfer radio bearers from the source LTE network to the target UMTS network. In a first scenario, during the UMTS radio bearer setup procedure in step 614, UE 601 enters step 615 and determines that radio bearer is being established (radio bearer setup procedure ongoing), and UE 601 does not starts the T3340 timer after performing step 615. In a second scenario, after the UMTS radio bearer setup procedure in step 614, UE 601 enters step 615 and determines that the radio bearer has been established (radio barer setup procedure completed), and UE 601 does not start the T3340 timer after performing step 615.

In another embodiment, upon receiving the Routing Area Update Accept message with "no follow-on proceed" indicator, UE 601 starts T3340. In one embodiment, up expiration of T3340, UE 601 checks if there exists radio-bearer-setup procedure. If UE 601 detects that there is or has been a radio-bearer-setup procedure, UE 601 does not release the signaling connection such that the PS signaling connection remains during the radio-bearer-setup procedure. If UE 601 determines that there is no radio-bearer-setup procedure, UE 601 releases the signal connection upon expiration of the timer T3340.

Figure 7:
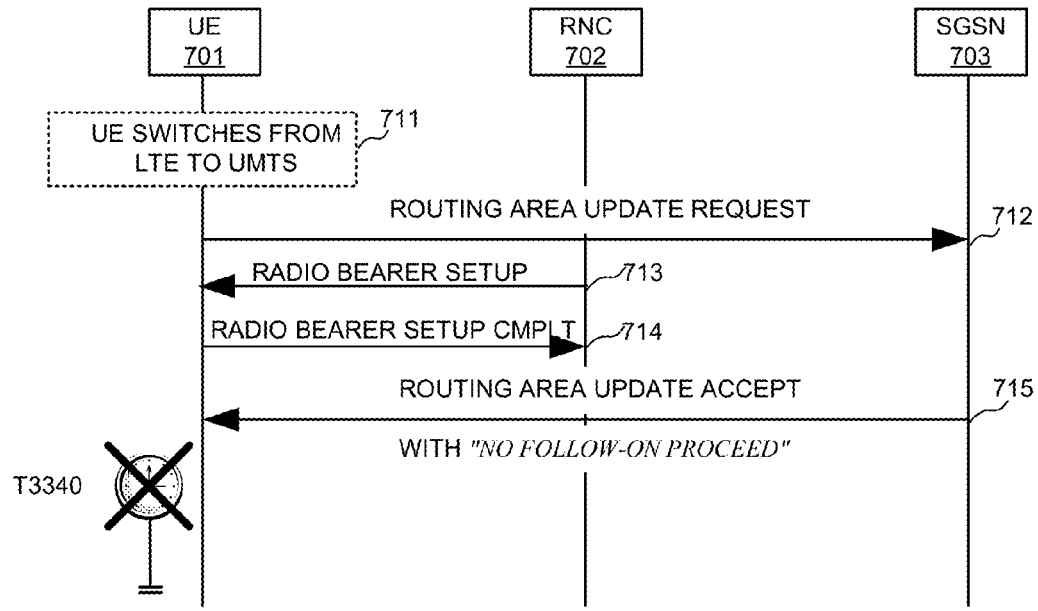
FIG. 7 shows an exemplary diagram of an improved inter-RAT handover procedure without starting T3340 timer when detecting existing radio bearer setup in accordance with one embodiment of the current invention.

FIG. 7 shows an exemplary diagram of an improved inter-RAT handover procedure without starting T3340 timer when detecting existing radio bearer setup in accordance with one embodiment of the current invention. A wireless network includes a UE 701, a RNC 702, and a SGSN 703. At step 711, UE 701 switches from LTE to UMTS. At step 712, UE 701 sends a Routing Area Update Request to SGSN 703. At step 713, RNC 702 sends a radio bearer setup message to UE 701. At step 714, UE 701 sends radio bearer setup complete message to RNC 702. SGSN 703 has no knowledge of the radio-bearer-setup procedure. At step 715, SGSN 703 sends a Routing Area Update Accept message to UE 701, with The Follow-on proceed bit coded as "no follow-on proceed". In one embodiment, upon receiving the Routing Area Update Accept message with "no follow-on proceed" indicator, UE 701 checks if there exists radio-bearer-setup procedure. If UE 701 detects that there is a radio-bearer-setup procedure, UE 701 does not start the T3340 timer such that the PS signaling connection remains during the radio-bearer-setup procedure. Note that step 714 may happen before or after the detection. Either way, UE 701 detects that a radio bearer is being established or has been established and does not start the T3340 timer to avoid service interruption.

Figure 8:
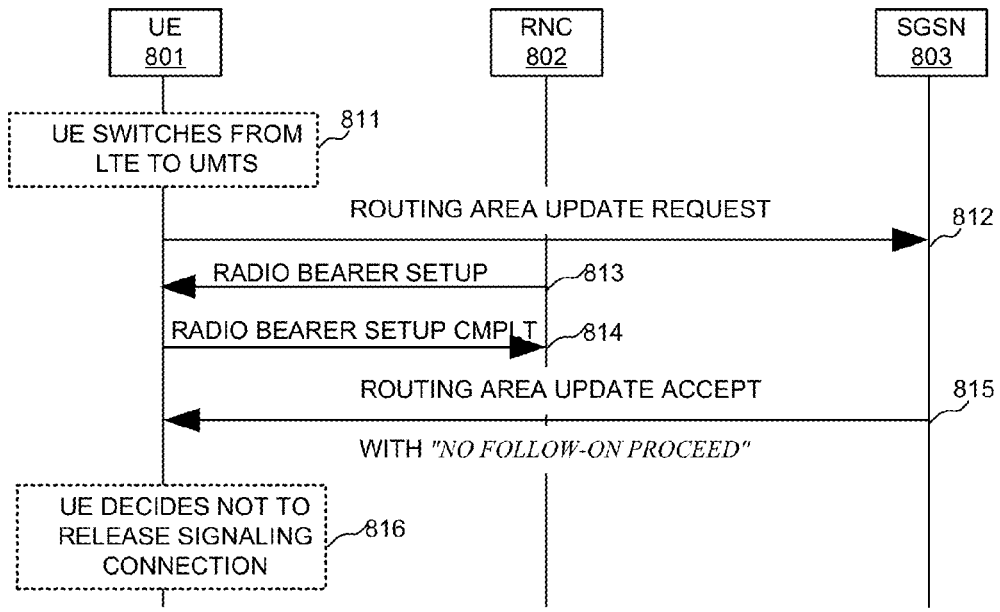
FIG. 8 shows an exemplary diagram of an improved inter-RAT handover procedure without releasing signaling connection when detecting existing radio bearer setup in accordance with one embodiment of the current invention.

FIG. 8 shows an exemplary diagram of an improved inter-RAT handover procedure without releasing signaling connection when detecting existing radio bearer setup in accordance with one embodiment of the current invention. A wireless network includes a UE 801, a RNC 802, and a SGSN 803. At step 811, UE 801 switches from LTE to UMTS. At step 812, UE 801 sends a Routing Area Update Request to SGSN 803. At step 813, RNC 802 sends a radio bearer setup message to UE 801. At step 814, UE 801 sends radio bearer setup complete message to RNC 802. SGSN 803 has no knowledge of the radio-bearer-setup procedure. At step 815, SGSN 803 sends a Routing Area Update Accept message to UE 801, with The Follow-on proceed bit coded as "no follow-on proceed". In one embodiment, upon receiving the Routing Area Update Accept message with "no follow-on proceed" indicator, UE 801 checks if there exists radio-bearer-setup procedure. If UE 801 detects that there is a radio-bearer-setup procedure, at step 816, UE 801 decides not to release the PS signaling connection. Note that step 814 may happen before or after the detection. Either way, UE 801 detects that a radio bearer is being established or has been established and does not release the signaling connection to avoid service interruption.

Figure 9:
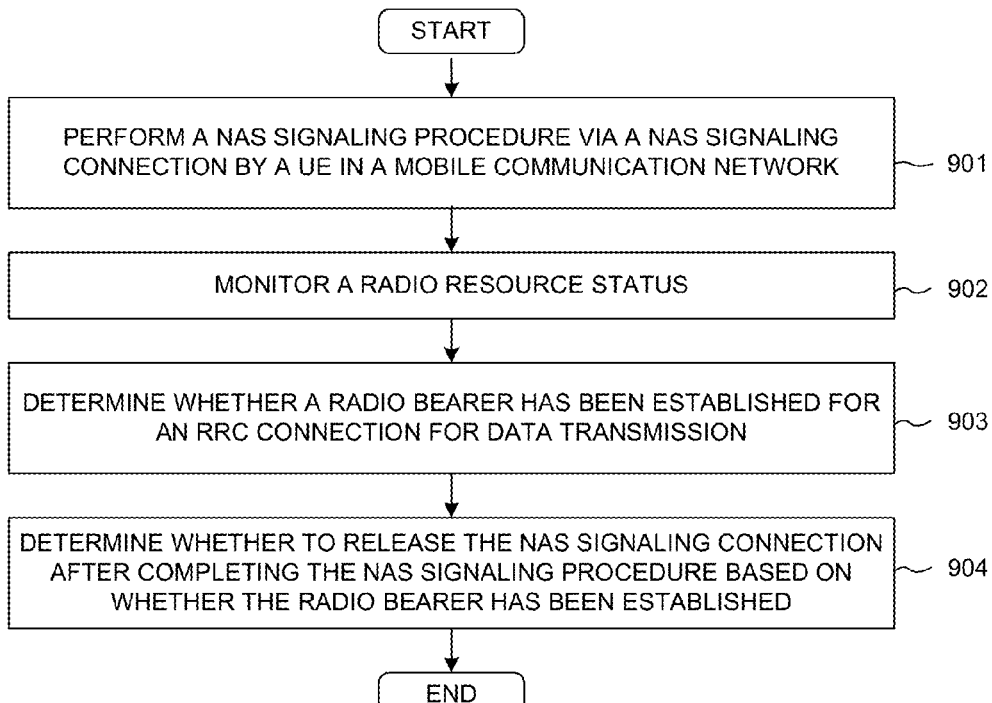
FIG. 9 is an exemplary flow chart for the UE performing the improved handover procedure for an intra-RAT handover in accordance with embodiments of the current invention.

FIG. 9 is an exemplary flow chart for the UE performing the improved handover procedure for an intra-RAT handover in accordance with embodiments of the current invention. At step 901, the UE performs a NAS signaling procedure via a NAS signaling connection in a mobile communication network. At step 902, the UE monitors a radio resource status. At step 903, the UE determines whether a radio bearer has been or is being established for a RRC connection for data transmission. At step 904, the UE determines whether to release the NAS signaling connection after completing the NAS signaling procedure based on whether the radio bearer has been or is being established.

Figure 10:
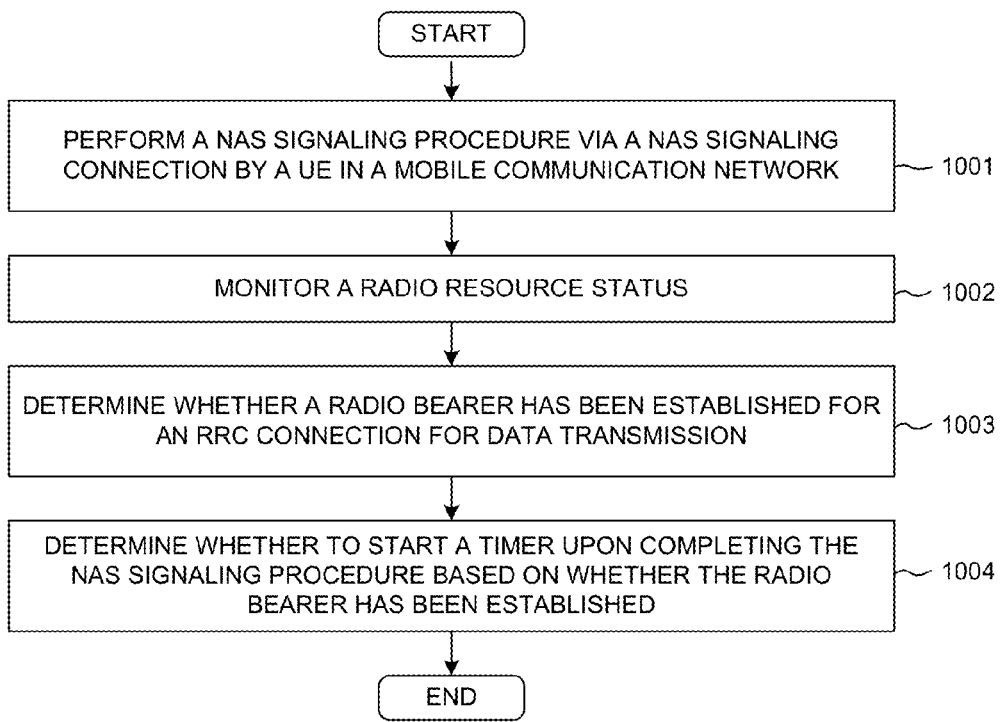
FIG. 10 is an exemplary flow chart for the UE performing the improved handover procedure for an inter-RAT handover in accordance with embodiments of the current invention.

FIG. 10 is an exemplary flow chart for the UE performing the improved handover procedure for an inter-RAT handover in accordance with embodiments of the current invention. At step 1001, the UE performs a NAS signaling procedure via a NAS signaling connection in a mobile communication network. At step 1002, the UE monitors a radio resource status. At step 1003, the UE determines whether a radio bearer has been or is being established for a RRC connection for data transmission. At step 1004, the UE determines whether to start a timer upon completing the NAS signaling procedure based on whether the radio bearer has been or is being established.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method comprising:
performing a non-access stratum (NAS) signaling procedure via a NAS signaling connection by a user equipment (UE);
monitoring a radio resource status;
determining whether a radio bearer has been or is being established for a radio resource control (RRC) connection for data transmission in a target network; and
determining whether to start a timer upon completing the NAS signaling procedure based on whether the radio bearer has been or is being established in the target network, wherein the UE starts the timer if no radio bearer has been established in the target network, and wherein the UE releases the NAS signaling connection upon the timer expiring.

2. The method of claim 1, wherein the NAS signaling procedure involves sending a routing area update request to the target network.

3. The method of claim 2, wherein the completing of the NAS signaling procedure involves receiving a routing area update accept message from the target network, and wherein the accept message comprises a "no follow-on proceed" indication.

4. The method of claim 1, wherein the UE does not start the timer if the radio bearer has been established in the target network.

5. The method of claim 1, further comprising:
performing an inter-radio access technology (RAT) handover procedure before performing the NAS signaling procedure.

6. The method of claim 5, wherein the UE receives a handover command for establishing the radio bearer in the target network.

7. The method of claim 1, wherein the UE receives an RRC radio bearer setup message from a source network during the NAS signaling procedure, and wherein the UE determines that the radio bearer is being established in the target network.

8. The method of claim 1, wherein the UE transmits an RRC radio bearer setup complete message to a source network after the radio bearer has been established in the target network.

9. A User Equipment (UE) comprising:
a non-access stratum (NAS) layer circuit that performs a NAS signaling procedure via a NAS signaling connection by the UE;
a management circuit that monitors a radio resource status and determines whether a radio bearer has been or is being established for a radio resource control (RRC) connection for data transmission in a target network; and
a timer, wherein the UE determines whether to start the timer upon completing the NAS signaling procedure based on whether the radio bearer has been or is being established in the target network, wherein the UE starts the timer if no radio bearer has been established in the target network, and wherein the UE releases the NAS signaling connection upon the timer expiring.

10. The UE of claim 9, wherein the NAS signaling procedure involves sending a routing area update request to the target network.

11. The UE of claim 10, wherein the completing of the NAS signaling procedure involves receiving a routing area update accept message from the target network, and wherein the accept message comprises a "no follow-on proceed" indication.

12. The UE of claim 9, wherein the UE does not start the timer if the radio bearer has been established in the target network.

13. The UE of claim 9, wherein the UE performs an inter-radio access technology (RAT) handover procedure before performing the NAS signaling procedure.

14. The UE of claim 13, wherein the UE receives a handover command for establishing the radio bearer in the target network.

15. The UE of claim 9, wherein the UE receives an RRC radio bearer setup message from a source network during the NAS signaling procedure, and wherein the UE determines that the radio bearer is being established in the target network.

16. The UE of claim 9, wherein the UE transmits an RRC radio bearer setup complete message to a source network after the radio bearer has been established in the target network.

* * * * *

UNITED STATES PATENT AND TRADEMARK OFFICE
CERTIFICATE OF CORRECTION

PATENT NO. : 10,015,835 B2
APPLICATION NO. : 15/712323
DATED : July 3, 2018
INVENTOR(S) : Yu-Syuan Jheng et al.

Page 1 of 1

It is certified that error appears in the above-identified patent and that said Letters Patent is hereby corrected as shown below:

On the Title Page

(63) application No. "14/644,434" should be "14/644,443"

Signed and Sealed this
Eighteenth Day of September, 2018

Andrei Iancu
*Director of the United States Patent and Trademark Office*